(12) United States Patent
Preisler et al.

(10) Patent No.: US 11,707,910 B2
(45) Date of Patent: *Jul. 25, 2023

(54) SANDWICH-TYPE, COMPOSITE COMPONENT HAVING AN INJECTION MOLDED BACKSIDE PROTECTIVE COVERING

(71) Applicant: Global IP Holdings, LLC, Sterling Heights, MI (US)

(72) Inventors: Darius J. Preisler, Macomb, MI (US); Christopher A. Heikkila, Washington Township, MI (US); Scott A. Grajek, Washington Township, MI (US); Jason T. Murar, Macomb, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 59 days.

This patent is subject to a terminal disclaimer.

(21) Appl. No.: 16/518,199

(22) Filed: Jul. 22, 2019

(65) Prior Publication Data

US 2021/0023811 A1 Jan. 28, 2021

(51) Int. Cl.
*B32B 3/30* (2006.01)
*B32B 3/12* (2006.01)
(Continued)

(52) U.S. Cl.
CPC .............. *B32B 3/30* (2013.01); *B32B 3/12* (2013.01); *B32B 2605/003* (2013.01);
(Continued)

(58) Field of Classification Search
CPC ................................ B32B 3/30; B60R 13/013
See application file for complete search history.

(56) References Cited

U.S. PATENT DOCUMENTS 5,026,445 A 6/1991 Mainolfi et al.
5,409,986 A * 4/1995 Boudry .................. C08L 31/04
524/505
(Continued)

FOREIGN PATENT DOCUMENTS

WO   2016028359 A2   2/2016
WO   WO-2016028359 A2 *  2/2016 ............. B29B 13/02

OTHER PUBLICATIONS

Kelly, P. "10 Viscoelasticity" chapter from "Solid Mechanics Part I: An Introduction to Solid Mechanics", 2015, p. 283-342; http://homepages.engihttp://homepages.engineering.auckland.ac.nz/~pkel015/SolidMechanicsBooks/Part_I/BookSM_Part_I/10_Viscoelasticity/10_Viscoelasticity_Complete.pdf (Year: 2015).*

(Continued)

*Primary Examiner* — Mark Ruthkosky
*Assistant Examiner* — Julia L Rummel
(74) *Attorney, Agent, or Firm* — Brooks Kushman P.C.

(57) ABSTRACT

A sandwich-type, composite component having an injection molded backside protective covering including 3-D structures which provide at least one pattern at an outer surface of the component is provided. The component includes a first outer layer having an outer surface, a second outer layer and a core bonded to and positioned between the outer layers and having a plurality of cavities. The covering is integrally formed from at least one elastomeric material and includes the 3-D structures bonded to the outer surface by injection molding. The 3-D structures are sized, shaped and arranged in one or more patterns at the outer surface. The one or more patterns may form a textured surface finish, a logo or indicia such as instructions at the outer surface. The component may be a vehicle interior component such as a vehicle load floor component.

12 Claims, 3 Drawing Sheets

(51) Int. Cl.
*B60R 5/04* (2006.01)
*B60R 13/01* (2006.01)
(52) U.S. Cl.
CPC .............. *B60R 5/04* (2013.01); *B60R 13/013* (2013.01); *B60Y 2306/09* (2013.01)

(56) References Cited

U.S. PATENT DOCUMENTS

| | | |
|---|---|---|
| 5,502,930 A | 4/1996 | Burkette et al. |
| 5,534,097 A | 7/1996 | Fasano et al. |
| 5,915,445 A | 6/1999 | Rauenbusch |
| 6,050,630 A | 4/2000 | Hochet |
| 6,066,217 A | 5/2000 | Dibble et al. |
| 6,102,464 A | 8/2000 | Schneider et al. |
| 6,435,577 B1 | 8/2002 | Renault |
| 6,537,413 B1 | 3/2003 | Hoch et al. |
| 6,655,299 B2 | 12/2003 | Preisler et al. |
| 6,682,675 B1 | 1/2004 | Vandangeot et al. |
| 6,682,676 B1 | 1/2004 | Renault et al. |
| 6,748,876 B2 | 6/2004 | Preisler et al. |
| 6,752,443 B1 | 6/2004 | Thompson et al. |
| 6,790,026 B2 | 9/2004 | Vandangeot et al. |
| 6,800,325 B2 | 10/2004 | Ehrath et al. |
| 6,825,803 B2 | 11/2004 | Wixforth et al. |
| 6,843,525 B2 | 1/2005 | Preisler |
| 6,890,023 B2 | 5/2005 | Preisler et al. |
| 6,905,155 B1 | 6/2005 | Presley et al. |
| 6,926,348 B2 | 8/2005 | Krueger et al. |
| 6,945,594 B1 | 9/2005 | Bejin et al. |
| 6,981,863 B2 | 1/2006 | Renault et al. |
| 7,059,646 B1 | 6/2006 | DeLong et al. |
| 7,090,274 B1 | 8/2006 | Khan et al. |
| 7,121,601 B2 | 10/2006 | Mulvihill et al. |
| 7,188,881 B1 | 3/2007 | Sturt et al. |
| 7,207,616 B2 | 4/2007 | Sturt |
| 7,222,915 B2 | 5/2007 | Philippot et al. |
| 7,419,713 B2 | 9/2008 | Wilkens et al. |
| 7,628,440 B2 | 12/2009 | Bernhardsson et al. |
| 7,909,379 B2 | 3/2011 | Winget et al. |
| 7,919,031 B2 | 4/2011 | Winget et al. |
| 8,117,972 B2 | 2/2012 | Winget et al. |
| 8,133,419 B2 | 3/2012 | Burks et al. |
| 8,298,675 B2 | 10/2012 | Alessandro et al. |
| 8,475,884 B2 | 7/2013 | Kia |
| 8,622,456 B2 | 1/2014 | Preisler et al. |
| 8,690,233 B2 * | 4/2014 | Preisler ..................... B60R 5/04 296/193.07 |
| 8,834,985 B2 | 9/2014 | Preisler et al. |
| 9,139,142 B2 | 9/2015 | Demo et al. |
| 9,770,849 B2 | 9/2017 | Preisler et al. |
| RE49,064 E * | 5/2022 | Preisler ..................... B60R 5/04 |
| 2004/0078929 A1 | 4/2004 | Schoemann |
| 2005/0189674 A1 | 9/2005 | Hochet et al. |
| 2006/0008609 A1 | 1/2006 | Snyder et al. |
| 2006/0255611 A1 | 11/2006 | Smith et al. |
| 2007/0065264 A1 | 3/2007 | Sturt et al. |
| 2007/0256379 A1 * | 11/2007 | Edwards ............... B32B 21/047 52/309.9 |
| 2007/0299193 A1 * | 12/2007 | Sauer ..................... C08J 5/046 524/495 |
| 2008/0185866 A1 | 8/2008 | Tarrant et al. |
| 2009/0108639 A1 | 4/2009 | Sturt et al. |
| 2010/0206467 A1 | 8/2010 | Durand et al. |
| 2011/0062742 A1 * | 3/2011 | Alford .................. B60R 13/013 296/97.23 |
| 2011/0260359 A1 | 10/2011 | Durand et al. |
| 2011/0315310 A1 | 12/2011 | Trevisan et al. |
| 2012/0247654 A1 | 10/2012 | Piccin et al. |
| 2012/0315429 A1 | 12/2012 | Stamp et al. |
| 2013/0031752 A1 | 2/2013 | Davies |
| 2013/0075955 A1 | 3/2013 | Piccin et al. |
| 2013/0137798 A1 | 5/2013 | Piccin |
| 2013/0264423 A1 * | 10/2013 | Hebensperger ......... B32B 27/12 244/121 |
| 2013/0278002 A1 | 10/2013 | Preisler et al. |
| 2013/0278003 A1 | 10/2013 | Preisler et al. |
| 2013/0278007 A1 * | 10/2013 | Preisler ................. B60R 13/011 296/97.23 |
| 2013/0278009 A1 | 10/2013 | Preisler et al. |
| 2013/0278015 A1 | 10/2013 | Preisler et al. |
| 2013/0278018 A1 | 10/2013 | Preisler |
| 2013/0278019 A1 | 10/2013 | Preisler et al. |
| 2013/0278020 A1 | 10/2013 | Preisler et al. |
| 2013/0280459 A1 | 10/2013 | Nakashima et al. |
| 2013/0280472 A1 | 10/2013 | Preisler et al. |
| 2013/0280473 A1 | 10/2013 | Preisler et al. |
| 2016/0361894 A1 | 12/2016 | Ciuperca |
| 2018/0290418 A1 * | 10/2018 | Nelson .................... B32B 27/08 |
| 2019/0093354 A1 * | 3/2019 | Dimitrakopoulos .... B32B 5/245 |

OTHER PUBLICATIONS

[Item U continued] and http://homepages.engineering.auckland.ac.nz/~pkel015/SolidMechanicsBooks/Part_I/index.html.*
Lakes, R., "Viscoelastic Measurement Techniques", Review of Scientific Instruments, 2004, vol. 75, p. 797-810. (Year: 2004).*
Schulman, A.; "Guide to Overmolding with Melt Processible Elastomers (MPEs),",2014, p. 1-10; Accessed at https://silo.tips/download/guide-to-overmolding-with-melt-processible-elastomers-mpes.*
Fivell, J.: "Low-buck Modding with the Plasti Dip Spray," 2013, p. 1-5. Accessed at http://www.mustangandfords.com/how-to/paint-body/1401-low-buck-modding-with-the-plasti-dip-spray/ (Year: 2013).
Industrial Rubber Goods, "How and Why do We Use Natural and Synthetic Rubber?", 2011, p. 1-2. Accessed at https://we.archive.org/web/20110411202622/http://www.industrialrubbergoods.com/articles/natural-synthetic-rubber.html (Year: 2011).
United States Court of Appeals, Federal Circuit. In re Nordt Dev. Co 881 F.3d 1371 (Fed Cir. 2018), Decided Feb. 8, 2018.
United States Patent and Trademark Office, Non-Final Office Action for U.S. Appl. No. 16/518,109, dated Feb. 3, 2021.

* cited by examiner

SANDWICH-TYPE, COMPOSITE COMPONENT HAVING AN INJECTION MOLDED BACKSIDE PROTECTIVE COVERING

CROSS-REFERENCE TO RELATED APPLICATIONS

This application is related to U.S. patent application Ser. No. 16/518,109, entitled "Sandwich-type, Composite Component Having a Sprayed Backside Protective Coating," filed Jul. 22, 2019 on the same day as this application.

TECHNICAL FIELD

This invention relates, in general, to the field of sandwich-type, composite components and, in particular, to such components which have an injection molded backside protective covering.

OVERVIEW

The term "facing material" refers to a material used to conceal and/or protect structural and/or functional elements from an observer. Common examples of facing materials include upholstery, carpeting, and wall coverings (including stationary and/or moveable wall coverings and cubicle wall coverings). Facing materials typically provide a degree of aesthetic appearance and/or feel, but they may also provide a degree of physical protection to the elements that they conceal. In some applications, it is desirable that the facing material provide properties such as, for example, aesthetic appeal (for example, visual appearance and/or feel) and abrasion resistance.

Facing materials are widely used in motor vehicle construction. In the automotive industry, it is common practice to refer to various surfaces as being A-, B-, or C-surfaces.

As used herein, the term "A-surface" refers to an outwardly-facing surface for display in the interior of a motor vehicle. This surface is a very high visibility surface of the vehicle that is most important to the observer or that is most obvious to the direct line of vision. With respect to motor vehicle interiors examples include dashboards, instrument panels, steering wheels, head rests, upper seat portions, headliners, load floors and pillar coverings.

Sandwich-type panels having cellular cores have very important characteristics because of their light weight and high strength. Conventionally, such panels are constructed by sandwiching a cellular core having low strength characteristics between two skins, each of which is much thinner than the cellular core but has excellent mechanical characteristics.

The prior art (i.e. U.S. Pat. No. 8,834,985) discloses a method of making a panel, generally indicated at 10 in FIG. 4, of a sandwich-type composite structure having a cellular core in a single processing step. In that method, the panel is made by subjecting a stack of layers of material to cold-pressing in a mold. As shown in FIGS. 3 and 4, the stack is made up of at least a first skin 14 made of a stampable reinforced thermoplastics material, a cellular core 16 made of a thermoplastic material, and a second skin 18 also made of a stampable reinforced thermoplastic material. Depressions or imprints 12 may be formed during the method. The stack may also include one or more external covering layers 20 made of a woven or non-woven thermoplastic material. The skins 14 and 18 are typically pre-heated outside the mold to a softening temperature.

Such a method is particularly advantageous because of the fact that it makes it possible, in a single operation, to generate cohesion and bonding between the various layers of the composite structure as shown in FIG. 4, and to shape the resulting panel while preserving all of the mechanical properties imparted by the cellular-core sandwich structure.

One problem associated with the above-noted method of making a panel of sandwich-type composite structure is that during the cold-pressing in a compression mold the air sealed within the cellular core 16 bonded to and between the skins 14 and 18 causes circular portions of one or both of the skins 14 to move inwardly into and towards the cells of the core 16 along the axes of the cells as the air cools. This causes the outer surface of one or both of the skins 14 and 18 to be debossed as shown in FIG. 4 at 12. Such effect may be termed an "oil-can" effect and results in a pattern of undesirable depressions or imprints 12 on the outer surface of one or both of the skins 14 and 18. Such undesirable depressions 12 can even be seen in facing material bonded to the outer surfaces of the skins 14 and 18 such as covering layers thereby resulting in a poor surface finish.

FIG. 1 (i.e. FIG. 4 of U.S. Pat. No. 8,834,985) discloses a sandwich-type composite component having imprinted 3-D structures which provide at least one pattern at an outer surface of the component. The component includes a first outer layer having an outer surface, a second outer layer and a core positioned between the outer layers and having a large number of cavities. The outer layers are bonded to the core by press molding. The first outer layer comprises an integral, unitary structure including 3-D structures imprinted by the press molding. The 3-D structures are sized, shaped and arranged in one or more patterns at the outer surface. The one or more patterns may form a textured surface finish, a logo or indicia such as instructions at the outer surface. The component may be a vehicle interior component such as a vehicle load floor component.

U.S. Pat. No. 9,770,849 discloses a method of making a sandwich-type, compression-molded, composite component having improved surface appearance. Resin skins and a core of a blank or stack of sandwich materials are heated to a softening temperature of the resin. A compression mold is provided including component-forming, upper and lower dies with opposing molding surfaces cooperating to define a mold cavity. The heated blank or stack is allowed to cool in the mold cavity until inner surfaces of the skins are bonded to top and bottom surfaces of the core to seal core cavities. Air in the sealed cavities urges softened portions of the skins inwardly towards the cavities of the core as the air in the cavities cools. A vacuum is applied at a first outer surface of the blank or stack in the mold cavity sufficient to prevent debossing and improve appearance of the first outer surface.

Panels of sandwich-type composition structure having a cellular core have rigidity characteristics sufficient to enable mechanical structures subjected to large stresses to be reinforced structurally without making them too heavy. Such panels are in common use in shipbuilding, aircraft construction, and rail vehicle construction.

To maximize the functionality of such panels, it is known, in particular, that hinges can be added so that the panels can be hinged to other panels. Such hinges are separate parts that are fixed to the panels by gluing, welding, riveting, or some other fastening technique.

A wide variety of welding technologies exist to join or bond molded plastic components together such as: ultrasonic welding; vibration welding; thermal welding; spin welding; infrared welding; hot plate welding; and laser welding. U.S. Pat. Nos. 6,066,217 and 5,026,445 are examples of such welding technologies. A problem with welding is the added weight and costs associated with welding.

Also, a wide variety of adhesives such as liquid and heat-sensitive solid film adhesive may be used to join plastic components together. Oftentimes a mold is used in the bonding process. U.S. patent documents U.S. Pat. Nos. 8,133,419; 5,534,097 and 2011/0315310 disclose examples. A problem with adhesives is the added weight and costs associated with adhesives.

Such hinges are fixed to the sandwich-structure composite panels in a separate and subsequent operation, after said panels have been formed. The subsequent operation requires an additional workstation, be it automated or otherwise, which increases, in particular, the manufacturing time and the manufacturing cost of the finished parts.

In addition, the fact that separate external parts are mounted on a composite panel of the sandwich-type is a source of quality defects, and thus adds to the cost of making such panels.

Published U.S. Patent Application 2005/0189674 discloses a method of making a composite panel of a sandwich structure with a hinge. The panel includes a stack made up of a first skin of a reinforced thermoplastics material, a cellular core made of thermoplastics material, and a second skin made of a reinforced thermoplastics material. The panel is formed by pressing the stack in a mold. The first and second skins are preheated to a softening temperature. As shown in FIGS. 3 and 4, after the panel has formed, an incision is made at a determined place in the panel so as to cut through one of the first and second skins, and substantially through the entire thickness of the cellular core, while leaving the other skin intact so that it forms a living hinge between two portions of the incised panel.

Other U.S. patent documents related to the present invention include: U.S. Pat. Nos. 5,502,930; 5,915,445; 6,050,630; 6,102,464; 6,435,577; 6,537,413; 6,655,299; 6,682,675; 6,748,876; 6,790,026; 6,682,676; 6,825,803; 6,843,525; 6,890,023; 6,981,863; 7,090,274; 7,419,713; 7,909,379; 7,919,031; 8,117,972; 2006/0255611; 2011/0315310; 2012/0315429; and 2008/0185866.

The following U.S. patent documents relate to cargo management systems and trim panels for automotive vehicles: U.S. Pat. Nos. 6,752,443; 6,800,325; 6,843,525; 6,905,155; 6,926,348; 6,945,594; 7,059,646; 7,090,274; 7,121,601; 7,188,881; 7,207,616; 7,222,915; 7,419,713; 7,628,440; 7,909,379; 8,298,675; 8,475,884; 2004/0078929; 2006/0008609; 2007/0065264; 2007/0256379; 2009/0108639; 2010/0206467; 2011/0260359; 2012/0247654; 2013/0031752; 2013/0075955; and 2013/0137798.

The following U.S. published applications are also related to the present application: 2013/0278002; 2013/0278003; 2013/0278007; 2013/0278008; 2013/0278009; 2013/0278015; 2013/0278018; 2013/0278019; 2013/0278020; 2013/0280459; 2013/0280472; and 2013/280473.

Beyond carrying cargo, the trunk of most passenger vehicles commonly contains various other components often behind or below a load floor. These components may be accessed by the vehicle's occupants or service personnel through hatches in the load floor or by removing carpet and support boards, etc. Typical components include:

Emergency supplies;
Spare tire;
Jack and lug wrench;
On-board tool kit for do-it-yourself repairs;
Electronics for sound, video GPS, etc.;
Battery and hybrid energy store;
Fuse boxes;
CNG/LPG tanks (for bivalent engines); and
Additional folding, or "third-row," seating.

A problem associated with load floors having covers which cover a storage area in an automotive vehicle is that loose items or objects in the storage area can cause relatively loud, undesirable noises during vehicle travel. Also, when the cover is in its open position the underside of the cover is not particularly visually appealing.

Another problem associated with such composites is that their function and design freedom is limited by the material which make up the composites. For example, one or more additional components are typically required to add one or more patterns, such as style features at the outer surface of the component.

Vehicle cargo compartments may be equipped with floor trays, liners or mats to protect underlying flooring, e.g., carpeting from exposure to liquids, dirt, debris and other elements that are tracked into the vehicle. Vehicle floor trays may include fitted sidewall portions to provide protective covering. Known three-dimensional floor trays may be molded from polymers having sufficient stiffness to retain the molded shape. Known floor mat system may include a single-piece continuous floor tray that covers the entire cargo floor.

SUMMARY OF EXAMPLE EMBODIMENTS

An object of at least one embodiment of the present invention is to provide a component having a sandwich-type, composite structure wherein an easy to clean, durable, protective covering is injection molded onto a backside of the component to form an integral structural component such as a vehicle interior component like a load floor. The protective covering can be made relatively thin thereby reducing weight.

In carrying out the above object and other objects of the present invention, a sandwich-type composite component having an injection molded backside protective covering including 3-D structures is provided. The component includes a first outer layer having an outer surface, an injection molded protective covering, a second outer layer and a core positioned between the outer layers and having a plurality of cavities. The outer layers are bonded to the core. The covering is integrally formed from at least one elastomeric material and includes 3-D structures bonded to the outer surface by injection molding. The 3-D structures are sized, shaped and arranged in at least one pattern at the outer surface.

The 3-D structures may provide a textured surface finish to the outer surface.

The 3-D structures may be embossed above the outer surface.

The 3-D structures may provide style features at the outer surface.

The at least one pattern may comprise a logo, a mark, a symbol, a graphic image or a monogram.

The at least one pattern may provide information at the outer surface.

The core may be a cellular core.

The core may be a thermoplastic core.

The core may be a honeycomb core such as a thermoplastic honeycomb core.

The outer layers may be fiber-reinforced thermoplastic layers.

The second outer layer may be a load-bearing layer.

The outer surface may be a B-surface.

The elastomeric material may be either a thermoset material or a thermoplastic material.

Further in carrying out the above object and other objects of at least one embodiment of the present invention, a sandwich-type, vehicle interior component having an injection molded, backside protective covering including 3-D structures is provided. The component includes a first outer layer having an outer surface, an injection molded protective covering, a second outer layer and a core positioned between the outer layers and having a plurality of cavities. The outer layers are bonded to the core. The covering is integrally formed from at least one elastomeric material and includes 3-D structures bonded to the outer surface by injection molding. The 3-D structures are sized, shaped and arranged in at least one pattern at the outer surface.

The elastomeric material may be either a thermoset material or a thermoplastic material.

Still further in carrying out the above object and other objects of at least one embodiment of the present invention, a sandwich-type, vehicle load floor component having an injection molded backside protective covering including 3-D structures is provided. The component includes a first outer layer having an outer surface, an injection molded protective covering, a second outer layer and a core positioned between the outer layers and having a plurality of cavities. The outer layers are bonded to the core. The covering is integrally formed from at least one elastomeric material and includes 3-D structures bonded to the outer surface by injection molding. The 3-D structures are sized, shaped and arranged in at least one pattern at the outer surface.

The elastomeric material may be either a thermoset material or a thermoplastic material.

Other technical advantages will be readily apparent to one skilled in the art from the following figures, descriptions and claims. Moreover, while specific advantages have been enumerated, various embodiments may include all, some or none of the enumerated advantages.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 2:
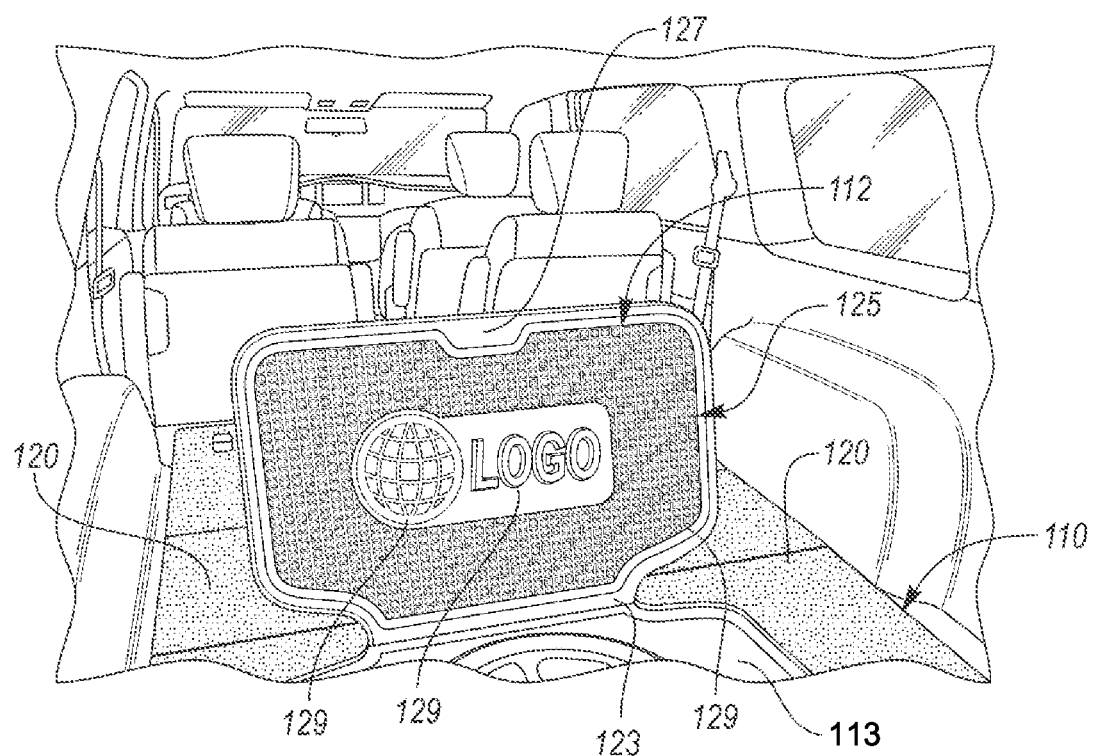
FIG. 2 is a view, similar to the view of FIG. 1, that shows an injection molded protective covering on the backside of a cover of a load floor constructed in accordance with at least one embodiment of the present invention.
Figure 3:
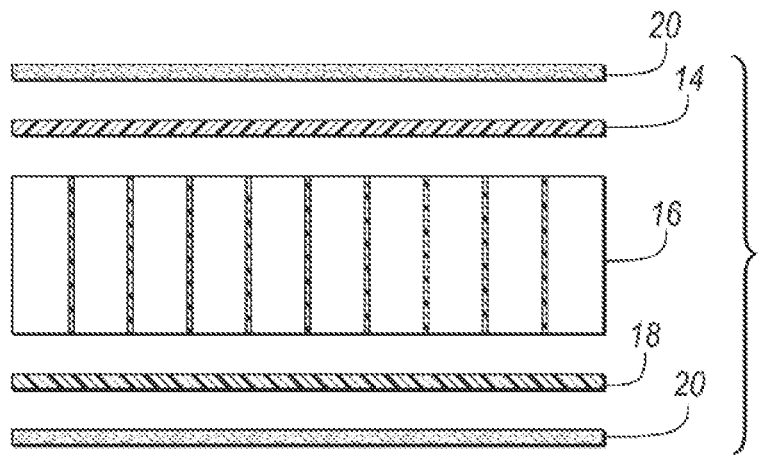
FIG. 3 is a side-sectional view, partially broken away, showing various separate layers of a prior art stack or blank of thermoplastic layers of material.
Figure 4:
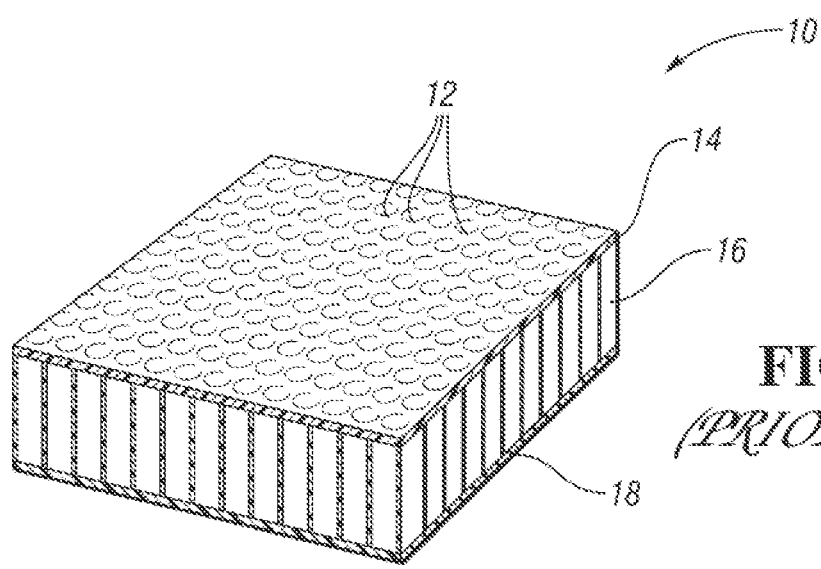
FIG. 4 is a top perspective sectional view of the stack of FIG. 3 but without outer carpet layers after low pressure, cold compression molding of the prior art.
Figure 5:
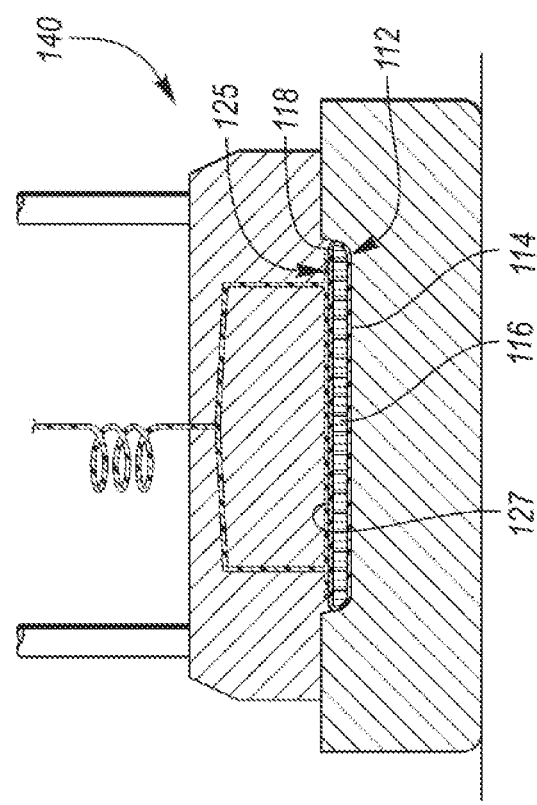
FIG. 5 is a view, partially broken away and in cross section, of a molding apparatus performing an injection molding process to injection mold a protective covering, generally of the type shown in FIG. 2, on the backside of a sandwich-type composite component such as a load floor.
Figure 6:
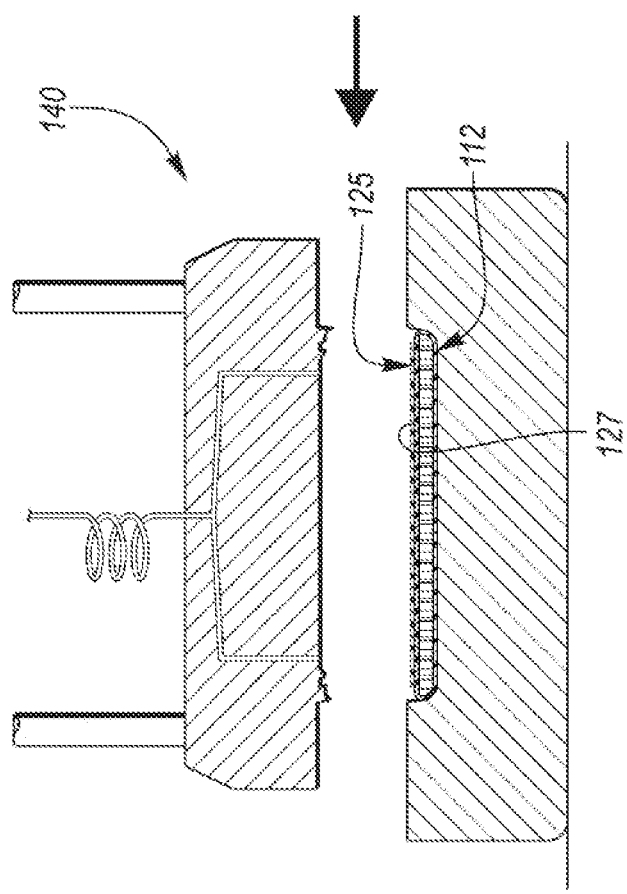
FIG. 6 is a view, similar to the view of FIG. 5, but with mold halves of the molding apparatus in their open position prior to removing the now-protected component.

Referring to FIGS. 2, 5 and 6 there is shown a carpeted, automotive vehicle, load floor, generally indicated at 110, including a compression-molded, composite panel constructed in accordance with at least one embodiment of the present invention. A cover, generally indicated at 112, of the load floor 110 covers a storage area 113 of the vehicle and is pivotally connected to the composite panel. A substantially continuous carpet layer 120 (not shown in FIGS. 5 and 6) may be bonded to the outer, top, class-A surface of the panel and the top surface of the cover 112 to at least partially form the carpeted load floor 110 having the carpeted cover 112. A living hinge 123 allows the carpeted cover 112 to pivot between different use positions including the open position of FIG. 2. A decorative, noise-management covering layer or protective covering, generally indicated at 125, is bonded to the bottom surface 127 of the cover 112 to reduce the level of undesirable noise in a passenger compartment of the vehicle in its closed position and to provide an aesthetically pleasing appearance to the bottom of the cover 112 in its open position (i.e. FIG. 2).

The covering 125 is integrally formed from at least one elastomeric material and includes 3-D structures 129 bonded to the outer surface 127 by injection molding. The 3-D structures 129 are sized, shaped and arranged in at least one pattern at the outer surface 127. The resulting mat provides a heavy-duty, long-lasting, easy to clean surface. A variety of textures and styles can be formed during the injection molding process.

The 3-D structures 129 may provide a textured surface finish to the outer surface 127.

The 3-D structures 129 may be embossed above the outer surface 127.

The 3-D structures 129 may provide style features at the outer surface 127.

The at least one pattern may comprise a logo, a mark, a symbol, a graphic image or a monogram as shown in FIG. 2.

Figure 1:
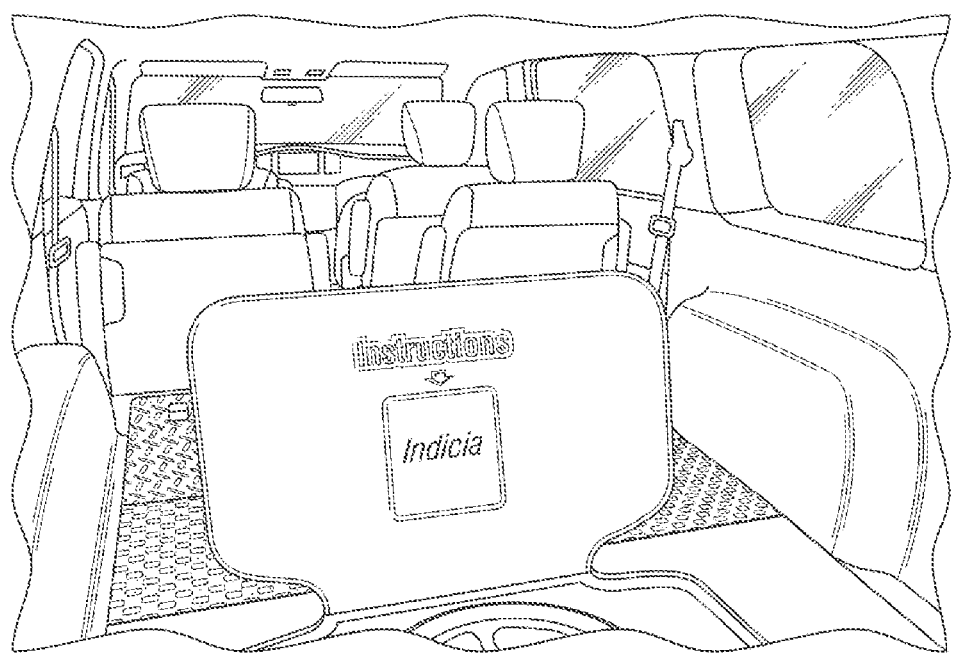
FIG. 1 is an environmental view, partially broken away, of a prior art load floor having a movable cover in its open position.

The at least one pattern may provide information at the outer surface 127 as shown in FIG. 1.

As is well known in the art, the load floor 110 is typically manufactured by providing a stack of material located or positioned within a mold (not shown). The cover 112 includes first and second reinforced thermoplastic skins or outer layers 114 and 118, respectively, a core 116 having a large number of cavities such as a thermoplastic cellular core disposed between and bonded to the skins 114 and 118 by press molding. The substantially continuous covering or carpet layer 120 is typically made of thermoplastic material and covers the first skin 114. The skins 114 and 118 are heated typically outside of the mold to a softening temperature. The mold is preferably a low-pressure, compression mold which performs a thermo-compression process on the stack of materials.

The thermoplastic carpet layer 120 not only covers the skin of the load floor 110, but also covers and is bonded to an outer surface of the outer skin 114 of the cover 112. An intermediate portion of the layer 120 may not be bonded to either the outer skin of the load floor or the outer skin 114 may form the living hinge 123. The living hinge 123 allows the carpeted cover 112 to pivot between the different use positions.

The carpet layer 120 may be resin carpet and the resin may be polypropylene. One side of the cover 112 may be covered with the carpet layer 120 which may be made of a woven or nonwoven material (typically of the carpet type).

The cellular core 116 may be a honeycomb core. In this example, the cellular core 116 has an open-celled structure of the type made up of tubes or a honeycomb, and it is made mainly of polyolefin and preferably of polypropylene. It is also possible to use a cellular structure having closed cells of the foam type. Alternatively, the core 116 may be made of cellulose (treated paper) or may be made of solid plastic.

Each of the skins 114 and 118 may be fiber reinforced. The thermoplastic of the skins 114 and 118, the covering layer 120 and the core 114 may be polypropylene. At least one of the skins 114 and 118 may be woven skin, such as polypropylene skin. Each of the skins 114 and 118 may be reinforced with fibers, e.g., glass fibers, carbon fibers or natural fibers. At least one of the skins 114 and 118 may advantageously be made up of woven glass fiber fabric and of a thermoplastic material.

In one example method of making the hinged load floor 110, stacks of material may be pressed in a low pressure cold-forming mold. The stack is made up of a first skin, a cellular core, a second skin and the covering layer 120, and is pressed at a pressure lying in the range of $10 \times 10^5$ Pa. to $30 \times 10^5$ Pa. The first and second skins are preferably preheated to make them malleable and stretchable. Advantageously, in order to soften the first and second skins, heat is applied to a pre-assembly constituted by the stack made up of at least the first skin, the cellular core, and the second skin so that, while a part of the load floor 110 is being formed in the mold, the first and second skins have a forming temperature lying approximately in the range of 160° C. to 200° C., and, in this example, about 180° C. In like fashion, the cover 112 may be formed.

The protective covering 125 may be integrally formed from a molten elastomeric material. The molten material typically is a low-viscosity, rubber, sound-damping compound based on liquid rubbers or elastomers and vulcanization agents, which may contain small quantities of structure-reinforcing fiber fillers, and have a low viscosity in the application state. Acoustic compounds of this kind are moldable with the aid of a conventional injection molding system 140 as shown in FIGS. 5 and 6. As shown in FIG. 5, the preformed panel or cover 112 has been placed into a mold of the molding system 140 and the elastomeric material is in the process of being injected over the cover 112. The material of the outer skin 118 and the injected material are compatible materials and a melt bond occurs at the interface between the two materials.

The elastomeric material may be either a thermoset material or a thermoplastic material or a mixture of both.

The elastomeric material may be a textured material.

The elastomeric material may be synthetic rubber material or a rubberized plastic material. The acoustic barrier layer or covering 125 is injected directly on the outer surface 127 of the skin 118 as shown in FIG. 5 in the injection molding process. The elastomeric material may be specialized rubber and rubber-like plastics for injection molding such as TPE, TPU and TPV elastomers. Examples of such materials are: Versa Flex (TPE), Elastollan (TPU) and Santoprene (TPV). Thermoplastic vulcanizates (TPV) are part of the thermoplastic elastomer (TPE) family of polymers and have elastomeric properties close to EPDM thermoset rubber.

The use of injection molding saves costs associated with the multiple processes of the prior art. Also, mats thinner than prior art mats can be provided on the underside of the load floor thereby providing weight savings. Finally, the process allows for repeatable patterns and added logo detail.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A sandwich-type, carpeted, vehicle load floor comprising:
   a sandwich-type, carpeted cover including: a first outer layer having an outer surface; a protective, acoustic barrier layer bonded to the outer surface of the first outer layer wherein the barrier layer overlies and is in contact with the first outer layer; a second outer layer having an outer surface; a substantially continuous carpet layer which covers and is bonded to the outer surface of the second outer layer and is bonded to a top surface of the rest of the load floor wherein an intermediate portion of the carpet layer between the carpeted cover and the rest of the load floor is not bonded to either the carpeted cover or the rest of the load floor to form a living hinge which allows the carpeted cover to pivot between covered and uncovered positions relative to the rest of the load floor; and a cellular core positioned between the outer layers and having a plurality of cavities wherein the outer layers are bonded to the core and wherein the barrier layer is integrally formed from at least one elastomeric, sound-damping material, the elastomeric, sound-damping material being a rubberized plastic material comprised of a mixture of a thermoset material and a thermoplastic material and the elastomeric, sound-damping material including 3-D structures bonded to the outer surface of the first outer layer, the 3-D structures being embossments sized, shaped, and arranged in at least one pattern at the outer surface of the first outer layer and wherein the at least one pattern comprises indicia indicative of instructions for use of the carpeted cover and wherein the barrier layer reduces a level of undesirable noise in the covered position of the carpeted cover and provides an aesthetically pleasing appearance to the carpeted cover in the uncovered position of the carpeted cover and wherein the protective, acoustic barrier layer is bonded to a backside of the rest of the load floor to reduce the level of undesirable noise in a passenger compartment of the vehicle.

2. The load floor as claimed in claim 1, wherein the cellular core is a honeycomb core.

3. The load floor as claimed in claim 1, wherein the cellular core is a plastic core.

4. The load floor as claimed in claim 1, wherein the cellular core is a plastic honeycomb core.

5. The load floor as claimed in claim 1, wherein the outer layers are fiber-reinforced plastic layers.

6. The load floor as claimed in claim 1, wherein the second outer layer is configured to be a load-bearing layer.

7. The load floor as claimed in claim 1, wherein the carpet layer is a plastic carpet layer.

8. The load floor as claimed in claim 1, wherein the carpet layer is a resin carpet.

9. The load floor as claimed in claim 8, wherein the resin is polypropylene.

10. The load floor as claimed in claim 1, wherein the carpet layer is made of a woven or non-woven material.

11. The load floor as claimed in claim 1, wherein the outer layers are fiber-reinforced thermoplastic layers.

12. A vehicle comprising:
- a passenger compartment having a deck with a storage area located below a part of the deck; and
- a sandwich-type, carpeted, load floor arranged on the passenger compartment deck;
- the load floor including a sandwich-type, carpeted load floor portion and a sandwich-type, carpeted cover, the carpeted cover being arranged adjacent the passenger compartment storage area;
- the carpeted cover including: a first outer layer having an outer surface; a protective, acoustic barrier layer bonded to the outer surface of the first outer layer wherein the barrier layer overlies and is in contact with the first outer layer; a second outer layer having an outer surface; a substantially continuous carpet layer which covers and is bonded to the outer surface of the second outer layer and is bonded to a top surface of the load floor portion wherein an intermediate portion of the carpet layer between the carpeted cover and the load floor portion is not bonded to either the carpeted cover or the load floor portion to form a living hinge which allows the carpeted cover to pivot relative to the load floor portion between a covered position in which the carpeted cover covers the passenger compartment storage area and an uncovered position in which the carpeted cover uncovers the passenger compartment storage area; and a cellular core positioned between the outer layers and having a plurality of cavities wherein the outer layers are bonded to the core and wherein the barrier layer is integrally formed from at least one elastomeric, sound-damping material, the elastomeric, sound-damping material being a rubberized plastic material comprised of a mixture of a thermoset material and a thermoplastic material and the elastomeric, sound-damping material including 3-D structures bonded to the outer surface of the first outer layer, the 3-D structures being embossments sized, shaped, and arranged in at least one pattern at the outer surface of the first outer layer and wherein the at least one pattern comprises indicia indicative of instructions for use of the carpeted cover and wherein the barrier layer reduces a level of undesirable passenger compartment storage area noise in the covered position of the carpeted cover and provides an aesthetically pleasing appearance to the carpeted cover in the uncovered position of the carpeted cover; and
- wherein the protective, acoustic barrier layer is bonded to a backside of the load floor portion to reduce the level of undesirable noise in the passenger compartment.

* * * * *